(No Model.)
E. REDMAN.
VELOCIPEDE.
No. 356,600. Patented Jan. 25, 1887.
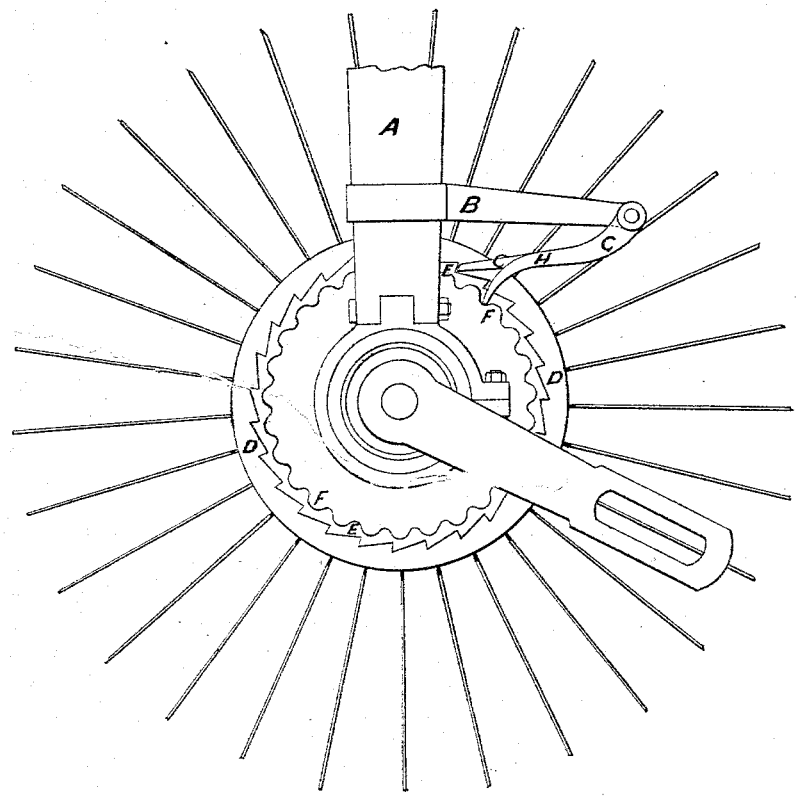
Witnesses
William D. Couner.
David S. Williams
Inventor:
Edward Redman
by his Attorneys
Howson & Son

UNITED STATES PATENT OFFICE.

EDWARD REDMAN, OF LONDON, ENGLAND, ASSIGNOR TO WILLIAM FISHER, OF SAME PLACE.

VELOCIPEDE.

SPECIFICATION forming part of Letters Patent No. 356,600, dated January 25, 1887.

Application filed August 24, 1886. Serial No. 211,714. (No model.) Patented in England August 6, 1886, No. 10,083.

*To all whom it may concern:*

Be it known that I, EDWARD REDMAN, a subject of the Queen of Great Britain and Ireland, and a resident of London, England, have invented an Improvement in Bicycles and other Velocipedes, (patented in England August 6, 1886, No. 10,083,) of which the following is a specification.

In bicycles of nearly all descriptions, and in many other velocipedes—such, for example, as tricycles of the Humber type—a great evil is experienced in that if the leading wheel or wheels comes or come in contact with a stone or other impediment in its or their path the rider is in danger of being precipitated forward, in consequence of the wheel or wheels being suddenly checked by the impediment.

Now, the object of this my invention is to obviate and remedy to a very great extent, if not altogether, this evil, of which the usual symptom and expression is the lifting up of the hinder wheel of the velocipede, whereby the fork or front frame thereof is caused to rake forward, and thus by this my invention I secure the rider, to a very great extent, from the aforesaid danger. I carry out this object by attaching a pawl to a bracket on the fork, and causing this pawl to engage a series of ratchet-teeth by the side of the flange of the hub of the leading-wheel in such a manner that, when the velocipede is properly proceeding forward, the pawl travels over the ratchet-teeth; but when a check is experienced, and the fork or front frame tends to rake forward, the pawl is immediately engaged and prevents this movement.

In order to explain my invention, I refer to the accompanying drawing, in which I have shown so much of a bicycle as will exhibit my apparatus.

On the lower part of the fork A, in a convenient position, I secure a bracket, B, to the end whereof is pivoted or jointed the pawl C. On the outer side of the flange D of the hub of the driving-wheel, and concentric therewith, I secure a disk or ring, E, the outer periphery of which is formed with ratchet-teeth, into which ratchet-teeth the pawl C can engage. Therefore, when the bicycle is proceeding forward in the normal manner, the pawl C travels easily and freely over the ratchet-teeth on the disk or ring E; but when any impediment is met with on the road, and the revolution of the wheel is checked thereby, thus tending to throw the rider forward, lifting up the hinder wheel, and causing the fork to rake forward, this movement is immediately checked by the pawl C bearing against one of the ratchet-teeth on the disk or ring E, whereby the rider is secured to a very great extent from the danger of being precipitated forward, as is desired.

In this apparatus as thus described, when all the meeting parts are made of metal, and are not covered with any other material, there may be, and generally will be, a slight clicking noise as the pawl travels over the ratchet-teeth while the bicycle is progressing; and, if desired, I can obviate this disadvantage, if it be so deemed, in the following manner: Another disk or ring, F, is secured on the outer side of the flange D of the hub of the driving-wheel, which may be larger than the aforesaid disk or ring E, or, as is preferable, may be somewhat smaller than the same, as is shown in the drawing, or may be of an equal size therewith, and on the outer periphery of this disk or ring F are formed a series of corrugations or indentations corresponding in number to the ratchet-teeth on the disk or ring E, and an arm, H, is attached to or formed with the pawl C, which arm H bears on these corrugations or indentations of the disk or ring F. These corrugations or indentations and the arm are so proportioned and formed that the pawl shall not rest on the ratchet-teeth, but shall always move just clear of the backs of the same, and shall be raised to pass over the points thereof, and thereafter shall be allowed to fall into the recesses following the same, but shall not strike on the back of the next tooth; and as these corrugations or indentations are rounded off, as shown in the drawing, so that the arm shall continuously be borne thereby, no noise will be created; but when required, as aforesaid, the pawl shall always be capable of immediately engaging the front of one of the ratchet-teeth, as is desired. Both these aforesaid disks or rings may either be made separately, and be secured on the flange of the hub of the wheel, or may be formed therewith, as may be desired, and the whole apparatus may be placed on one side of the bicycle, or on both sides thereof, as may be deemed expedient.

In the same manner this my improvement may be applied to other velocipedes whenever and wherever it may be required, and no further description is or can be necessary to explain the same.

I would also state that I consider the positions, proportions, shapes, and dimensions of the bracket B, the pawl C, and the arm H, if any, as shown in the drawing, are the best and most convenient and effective for carrying out my aforesaid object; but I do not limit myself thereto, for the pawl C and the arm H, if any, may be formed and constructed to engage on their respective disks or rings E and F in any positions, and the bracket B would be constructed and formed and secured on the fork or frame A in accordance therewith.

I am aware that it has heretofore been proposed to provide bicycles with ratchets to prevent the frame from overrunning the wheel and precipitating the rider; but I believe it to be new to construct the device in the manner I have above described, so that it can be applied to bicycles and other velocipedes which have already been constructed in any of the well-known ways.

I claim as my invention—

1. The combination of the fork of a bicycle or other velocipede, bracket B, secured thereto, and pawl pivoted to the bracket with the hub of the wheel provided with a ratchet disk or ring, substantially as and for the purpose described.

2. The combination of the wheel of a bicycle or other velocipede having a ratchet disk or ring and a corrugated disk or ring, F, with the frame carrying a pawl provided with an arm, H, substantially as and for the purpose described.

In testimony whereof I have signed my name to this specification in the presence of two subscribing witnesses.

EDWARD REDMAN.

Witnesses:
WILLIAM FISHER,
JAS. HART.